United States Patent

Sekiguchi

Patent Number: 5,982,423
Date of Patent: Nov. 9, 1999

[54] VIDEO PHOTOGRAPHING APPARATUS HAVING INFRARED RAYS AV TRANSMITTING FUNCTION

[75] Inventor: Masami Sekiguchi, Kanagawa, Japan

[73] Assignee: Sony Corporation, Tokyo, Japan

[21] Appl. No.: 08/907,038

[22] Filed: Aug. 6, 1997

[30] Foreign Application Priority Data

Aug. 13, 1996 [JP] Japan .................................. 8-213408

[51] Int. Cl.6 .............................. H04N 5/33; G02F 1/01
[52] U.S. Cl. ........................... 348/216; 348/164; 250/330
[58] Field of Search .................... 348/216, 164, 348/342, 360, 361, 162, 165; 250/350, 341.8, 351

[56] References Cited

U.S. PATENT DOCUMENTS

| | | | |
|---|---|---|---|
| 4,437,111 | 3/1984 | Inai et al. ................................. | 348/216 |
| 5,534,696 | 7/1996 | Johansson et al. ....................... | 250/330 |
| 5,781,236 | 7/1998 | Shinbori et al. ......................... | 348/342 |

*Primary Examiner*—Wendy Garber
*Assistant Examiner*—Alicia M. Harrington
*Attorney, Agent, or Firm*—Frommer Lawrence & Haug, LLP.; William S. Frommer

[57] ABSTRACT

In a video photographing apparatus having an infrared rays AV transmitting function, there are provided: exchanging unit for moving the infrared rays cutting filter serving as a component element of a camera portion to an outside of an optical path and, in place of it, for arranging the infrared rays transmitting material such that the optical path is equivalent to that of the infrared rays cutting filter onto the optical path; switching unit for switching an infrared rays emitting unit for infrared rays AV transmission to the turn-on in the non-modulating state; and sensitivity switching operating unit for making the exchanging unit and the switching unit operative in an interlocking manner.

8 Claims, 3 Drawing Sheets

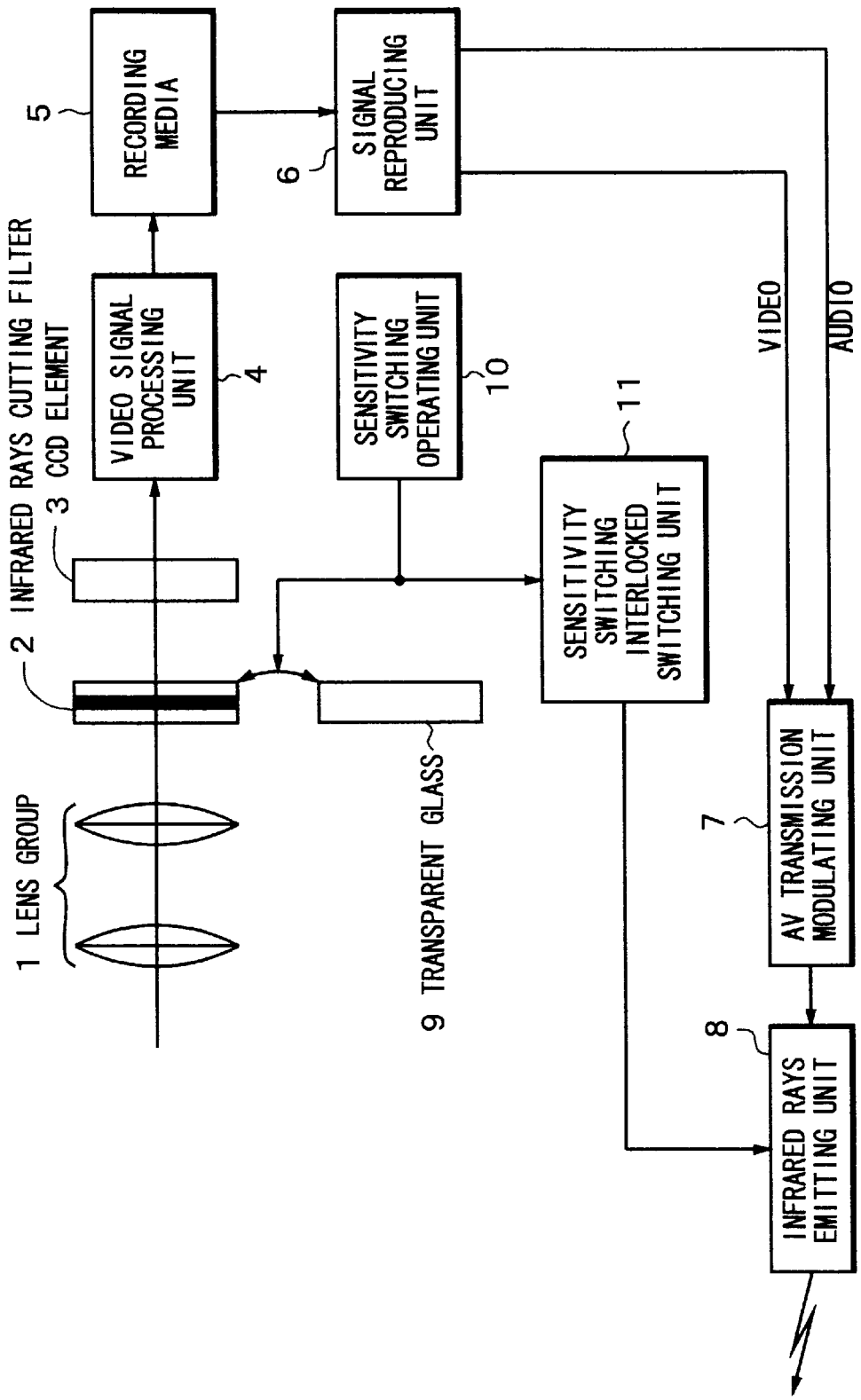

VIDEO PHOTOGRAPHING APPARATUS HAVING INFRARED RAYS AV TRANSMITTING FUNCTION

BACKGROUND OF THE INVENTION

1. Field of the Invention

The invention relates to a video camera which is frequently used at a home and, more particularly, to a video photographing apparatus having an infrared rays AV transmitting function. In more detail, the invention relates to a video photographing apparatus which can accurately photograph an object even in a dark state.

2. Description of the Related Art

Generally, a video photographing apparatus having a CCD image pickup element, what is called a video camera, has a function for recording a video signal and audio signals onto a recording medium such as tape, magnetic disk, or the like and a function for reproducing those signals.

In recent years, an apparatus in which an infrared rays AV transmitting function is added to the video photographing apparatus having such a function in order to transmit the reproduced video signal and audio signals to a monitor apparatus such as a television receiver or the like installed at a position away from the video photographing apparatus has also appeared.

The video photographing apparatus has a construction such that at the time of an infrared rays AV transmission, the video signal and audio signals are modulated on the basis of an infrared rays AV transmission format determined by EIAJ or the like.

Therefore, infrared rays emitting means and modulating means for modulating the infrared rays by the reproduced video signal and audio signals are added to the video photographing apparatus having the infrared rays AV transmitting function.

The conventional video photographing apparatus can record a clear image when an ambient state of an object is bright like a daytime.

When the ambient state is dark (at the time of a low illuminance) like an evening or a night, however, there is a problem such that the image is unclear or cannot be recorded depending on the case.

Such a problem similarity occurs also with respect to a video photographing apparatus having an infrared rays AV transmitting function.

OBJECTS AND SUMMARY OF THE INVENTION

It is an object of the invention to provide a video photographing apparatus having an infrared rays AV transmitting function which can clearly record (photograph) an image even in a dark state.

According to the invention, there is provided a video photographing apparatus having an infrared rays AV transmitting function, comprising: exchanging means for moving the infrared rays cutting filter serving as a component element of a camera portion to the outside of an optical path and, in place of it, for arranging the infrared rays transmitting material such that an optical path is equivalent to that of the infrared rays cutting filter onto the optical path; switching means for switching an infrared rays emitting unit for an infrared rays AV transmission to a turn-on in a non-modulating state; and sensitivity switching operating means for making the exchanging means and the switching means operative in an interlocking manner.

There is also provided optical axis correcting means for correcting so as to make an optical axial direction of the infrared rays emitting unit coincide with the optical axial direction where infrared rays enter the camera portion in an interlocked relation with the sensitivity switching operating means.

Further, the exchanging means has a structure such that the infrared rays cutting filter and the infrared rays transmitting material are slid on a same plane in the direction perpendicular to the optical path, a structure such that the infrared rays cutting filter and the infrared rays transmitting material are slid on a same plane in the direction perpendicular to the optical path, or a structure such that one of the infrared rays cutting filter and the infrared rays transmitting material is arranged onto the optical path by a rotation of a rotational axis arranged in the direction perpendicular to the optical path.

According to further another invention, there is further provided a video photographing apparatus having an infrared rays AV transmitting function, comprising: moving means for moving an infrared rays cutting filter as a component element to an outside of an optical path; switching means for switching an infrared rays emitting unit for an infrared rays AV transmission to a turn-on in a non-modulation; and sensitivity switching operating means for making the moving means and the switching means operative in an interlocking manner.

The above, and other, objects, features and advantage of the present invention will become readily apparent from the following detailed description thereof which is to be read in connection with the accompanying drawings.

BRIEF DESCRIPTION OF THE DRAWINGS

FIG. 1 is a functional block diagram showing an embodiment of a construction of a main section with respect to a video photographing apparatus having an infrared rays AV transmitting function of the invention;

DETAILED DESCRIPTION OF THE PREFERRED EMBODIMENTS

Figure 2A:
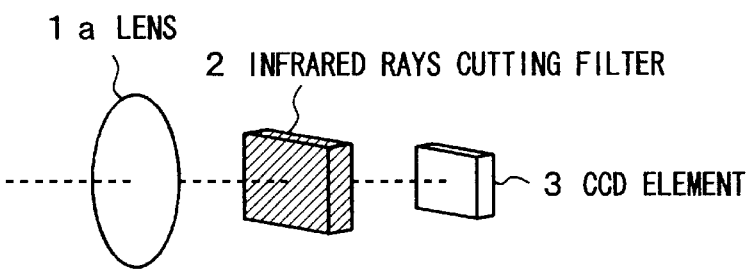
FIGS. 2A to 2D are diagrams showing a specific embodiment with regard to an exchanging system of an infrared rays cutting filter 2 and a transparent glass 9 shown in FIG. 1.

Embodiments of a video photographing apparatus having an infrared rays AV transmitting function of the invention will now be described with reference to the drawings.

The embodiments correspond to the inventions in claims 1 to 5.

The invention has a feature with respect to a point that an attention is paid to a point that in case of the video photographing apparatus having the infrared rays AV transmitting function, the emitting system of the infrared rays is used only in the reproducing mode and is not used in the camera photographing mode and the emitting system of the infrared rays is used for photographing in a dark state (at the time of the low illuminance).

As mentioned above, by enabling the emitting system of the infrared rays to be also used in the photographing mode, a use range of the video photographing apparatus can be remarkably expanded by adding the minimum number of parts.

FIG. 1 is a functional block diagram showing an example of the embodiment of a construction of a main section with respect to the video photographing apparatus having the infrared rays AV transmitting function of the invention. In the diagram, reference numeral 1 denotes a lens group; 2 an infrared rays cutting filter; 3 a CCD element; 4 a video signal processing unit; 5 a recording media; 6 a signal reproducing unit; 7 an AV transmission modulating unit; 8 an infrared rays emitting unit; 9 a transparent glass; 10 a sensitivity switching operating unit; and 11 a sensitivity switching interlocked switching unit.

First, blocks which are common to conventional ones will now be described.

The camera portion of the photographing system is made up of: the lens group 1; infrared rays cutting filter 2; and CCD element 3.

The infrared rays cutting filter 2 operates so as to prevent that an output of the CCD element 3 is saturated especially by an infrared rays component among light components which are inputted from the lens group 1.

In the normal photographing mode, the light passed through the lens group 1 are transmitted through the infrared rays cutting filter 2, by which unnecessary infrared rays are eliminated, so that an image of an object is formed on the CCD element 3.

The video image formed on the CCD element 3 as mentioned above is converted into an electric signal and is processed by the video signal processing unit 4 and is recorded onto the recording media 5 such as magnetic tape of, for example, 8 mm, floppy disk, or the like.

In order to easily understand, in FIG. 1, although the audio signal system is not shown, audio signals from an audio input unit such as a microphone or the like provided for the camera portion are also simultaneously recorded onto the recording media 5. Similarly, the view finder system for the photographer to confirm a photographing range is also not shown.

As a reproducing system, for the infrared rays AV transmission, the signal reproducing unit 6, AV transmission modulating unit 7, and infrared rays emitting unit 8 are provided.

The infrared rays emitting unit 8 is equipped with emitting means such as an infrared rays LED or the like and has a function for emitting the infrared rays.

The AV transmission modulating unit 7 has a function for modulating the video signal and audio signals reproduced in the signal reproducing unit 6 into an infrared rays AV transmission format of EIAJ or the like.

Therefore, the infrared rays emitted from the infrared rays emitting unit 8 are modulated into the infrared rays AV transmission format and are transmitted to a monitor apparatus such as a television receiver or the like (not shown), and a visual display of the video signal and a reproduction of the audio signals are performed.

An outline of the construction and operation which are common to those of the conventional apparatus regarding the normal photographing mode and reproducing mode has been described above.

When the ambient state of the object is dark (at the time of a low illuminance), in order to raise a sensitivity of the camera portion, the sensitivity switching operating unit 10 and sensitivity switching interlocked switching unit 11 are added to the video photographing apparatus of the invention shown in FIG. 1.

The sensitivity switching operating unit 10 has a function for moving the infrared rays cutting filter 2 to the outside of the optical path of the camera portion and for exchanging the filter to the infrared rays transmitting material, for example, the transparent glass 9 such that the optical path is equivalent to that of the infrared rays cutting filter 2.

The sensitivity switching interlocked switching unit 11 has a function for switching the circuit so that the infrared rays which are emitted from the infrared rays emitting unit 8 are not modulated by the AV transmission modulating unit 7 in the interlocked relation with the operation of the sensitivity switching operating unit 10.

By constructing as shown in FIG. 1, in case of photographing in the dark state, if the sensitivity switching operating unit 10 is operated and the mode is set to, for instance, the high sensitivity side (from the normal sensitivity side), in the photographing state, the non-modulated infrared rays from the infrared rays emitting unit 8 are irradiated onto the object and the transparent glass 9 is arranged in the camera portion in place of the infrared rays cutting filter 2.

The sensitivity switching operating unit 10 is constructed in a manner such that, when the sensitivity switching operating unit 10 operates, the optical axial direction of the infrared rays which are emitted from the infrared rays emitting unit 8 coincides with the optical axial direction where the infrared rays enter the camera portion.

Therefore, in a manner similar to so-called a night vision camera device, even in a relatively dark state, a clear image can be recorded by the infrared rays reflected from the object.

An exchanging mechanism between the infrared rays cutting filter 2 and transparent glass 9 will now be described.

Figure 2B:
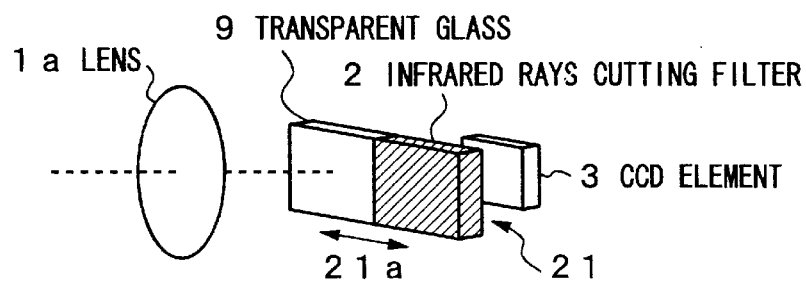
Figure 2C:
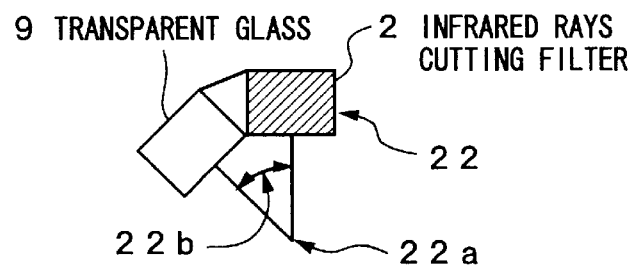
Figure 2D:
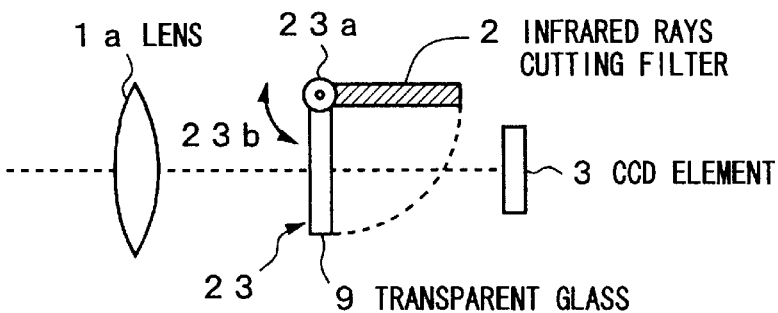

FIGS. 2A to 2D are diagrams showing specific embodiments with respect to an exchanging system of the infrared rays cutting filter 2 and transparent glass 9 shown in FIG. 1. FIG. 2A is a perspective view showing an arranging state of the infrared rays cutting filter 2. FIG. 2B is a perspective view showing a system in which the infrared rays cutting filter 2 and transparent glass 9 are slid. FIG. 2C is a front view showing a system in which the infrared rays cutting filter 2 and transparent glass 9 are rotated on the same plane. FIG. 2D is a side elevational view showing a system in which the infrared rays cutting filter 2 and transparent glass 9 are rotated to the direction almost perpendicular to the optical path. Component elements in FIGS. 2A to 2D are designated by the same reference numerals as those in FIG. 1. Reference numeral 1a denotes an aftermost lens of the lens group 1; 21 the infrared rays cutting filter 2 and transparent glass 9 which are arranged on the same plane so as to be neighboring. An arrow 21a shows a sliding direction. Reference numeral 22 indicates the infrared rays cutting filter 2 and transparent glass 9 which have a rotational center on the outside of the optical path and are arranged in a fun-shape on the same plane; 22a a position of the rotational center thereof; 22b a rotation range thereof; 23 the infrared rays cutting filter 2 and transparent glass 9 which have a rotational center on the outside of the optical path in the direction which traverses the optical path and are arranged at an almost right angle; 23a a position of a rotational axis thereof; 23b a movement range of the transparent glass 9.

FIG. 2A shows a perspective view in a state in which in the conventional video photographing apparatus, the infrared rays cutting filter 2 is arranged between the aftermost lens 1a of the lens group 1 and the CCD element 3.

Even in the video photographing apparatus of the invention, in case of the normal sensitivity, the apparatus is used in a state in which the infrared rays cutting filter 2 is arranged on the optical path in a manner similar to FIG. 2A.

When the sensitivity is switched to the high sensitivity side, however, the infrared rays cutting filter 2 and transparent glass 9 are exchanged by the operation of the sensitivity switching operating unit 10 in FIG. 1.

As shown at 21 in FIG. 2B, for example, the infrared rays cutting filter 2 and transparent glass 9 are arranged on the same plane in the direction perpendicular to the optical path and are slid in the direction perpendicular to the optical path as shown by the arrow 21a.

By using the sliding system, the infrared rays cutting filter 2 and transparent glass 9 can be exchanged in a relatively small space.

The invention can be also constructed in a manner such that as shown at 22 in FIG. 2C, the infrared rays cutting filter 2 and transparent glass 9 are arranged in the fun-shape on the same plane in the direction perpendicular to the optical path, are supported at the position 22a by the operation of the sensitivity switching operating unit 10, and are set to be rotatable around the position 22a as a center. In this instance, it is sufficient to rotate in the rotation range 22b.

Further, as shown at 23 in FIG. 2D, surfaces of the infrared rays cutting filter 2 and transparent glass 9 are arranged at an almost right angle, the rotational axis 23a can be also provided on the outside of the optical path and in the direction which crosses the optical path (the direction perpendicular to the optical path). Even if the positions of the infrared rays cutting filter 2 and transparent glass 9 are exchanged, a similar effect can be obtained.

In this case, the position where the rotational axis 23a is attached can be set to an upper or lower direction or a left or right direction of the camera portion.

A sliding mechanism as shown in FIG. 2B and rotating mechanisms as shown in FIGS. 2C and 2D can be easily realized by well-known mechanical means. Since a mechanism for making the optical axial direction of the infrared rays which are emitted from the infrared rays emitting unit 8 and the optical axial direction where the infrared rays enter the camera portion in FIG. 1 coincide can be also similarity easily realized, its detailed explanation is omitted.

Further, the sensitivity switching interlocked switching unit 11 for shutting off the circuit connection between the AV transmission modulating unit 7 and infrared rays emitting unit 8 and for turning on the infrared rays emitting unit 8 in the non-modulating state in the interlocked relation with the operation of the sensitivity switching operating unit 10 can be also realized by well-known means.

Another embodiment with respect to a video photographing apparatus having an infrared rays AV transmitting function of the invention will now be described with reference to the drawings.

The embodiments correspond to the inventions of claims 7 and 8.

Figure 3:
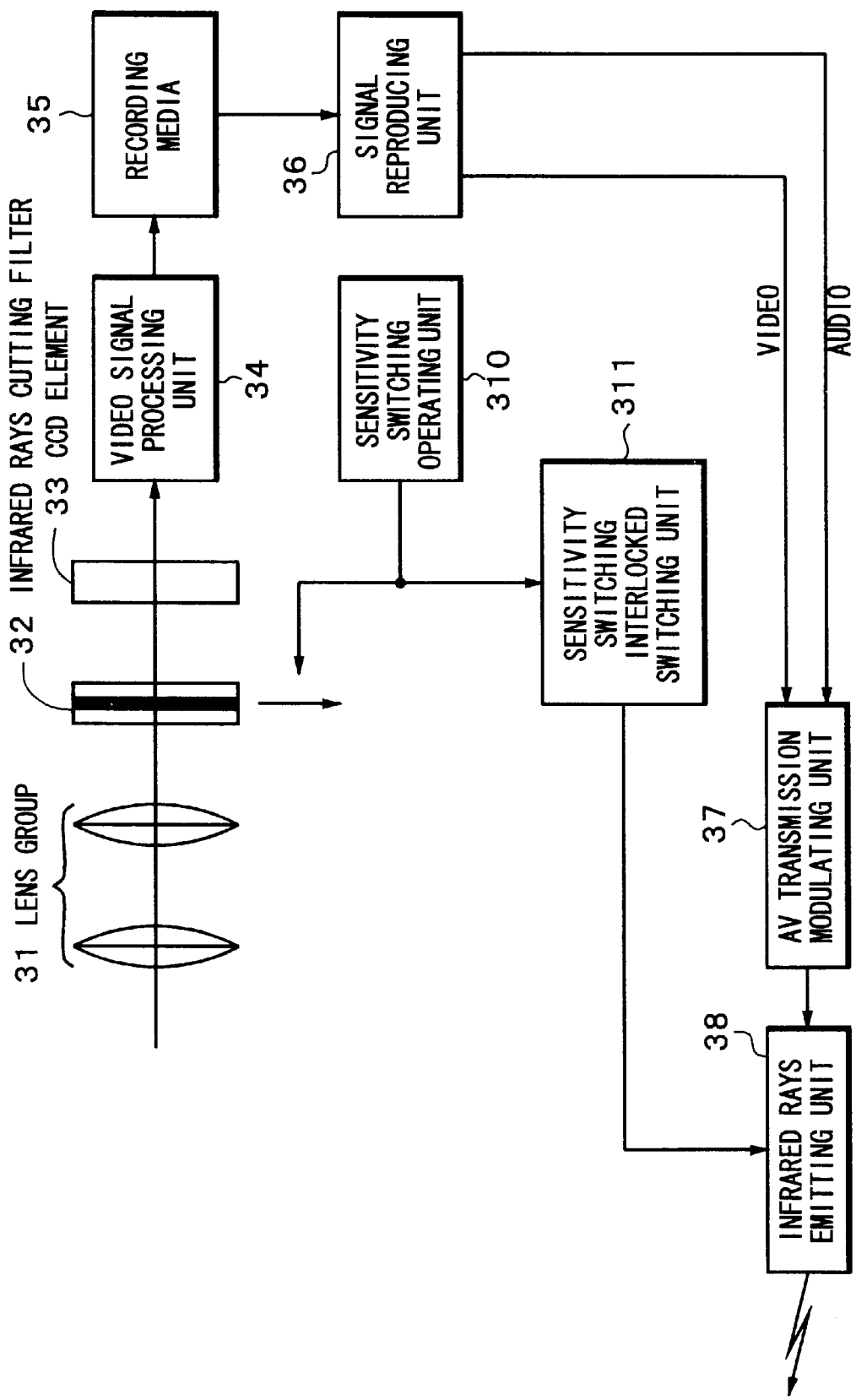
FIG. 3 is a functional block diagram showing another embodiment a construction of a main section in a video photographing apparatus having an infrared rays AV transmitting function of the invention.

FIG. 3 is a functional block diagram showing an embodiment of a construction of a main section with regard to the video photographing apparatus having the infrared rays AV transmitting function of the invention. In FIG. 3, reference numeral 31 denotes a lens group; 32 an infrared rays cutting filter; 33 a CCD element; 34 a video signal processing unit; 35 a recording media; 36 a signal reproducing unit; 37 an AV transmission modulating unit; 38 an infrared rays emitting unit; 310 a sensitivity switching operating unit; 311 a sensitivity switching interlocked switching unit.

Blocks which are common to conventional ones are omitted because their descriptions are similar to those in FIG. 1.

When an ambient state of an object is dark (at the time of a low illuminance), in order to raise a sensitivity of a camera portion, the sensitivity switching operating unit 310 and sensitivity switching interlocked switching unit 311 are added to the video photographing apparatus in FIG. 3.

The sensitivity switching operating unit 310 has a function for moving the infrared rays cutting filter 32 to the outside of the optical path of the camera portion.

The sensitivity switching interlocked switching unit 311 has a function for switching the circuit so as to prevent that the infrared rays which are emitted from the infrared rays emitting unit 38 are modulated by the AV transmission modulating unit 37 in an interlocked relation with the sensitivity switching operating unit 310.

By constructing as shown in FIG. 3, in case of photographing in the dark state, the sensitivity switching operating unit 310 is operated and the sensitivity is set to, for example, the high sensitivity side (from the normal sensitivity side), in the photographing state, the non-modulating infrared rays are irradiated to the object from the infrared rays emitting unit 38 and the infrared rays cutting filter 32 is set to the outside of the optical path in the camera portion.

The sensitivity switching operating unit 310 is constructed in a manner such that when the sensitivity switching operating unit 310 operates, an optical axial direction of the infrared rays which are emitted form the infrared rays emitting unit 38 coincides with the optical axial direction where the infrared rays enter the camera portion.

According to the video photographing apparatus shown in FIG. 3, in case of switching the sensitivity to the high sensitivity side, the infrared rays cutting filter 32 is moved to the outside of the optical path by the operation of the sensitivity switching operating unit 310. However, in case of the video photographing apparatus having the AF function, since a focusing control is performed in an interlocked relation with such a movement, a blur of an image doesn't occur. The AF control can be realized by well-known means.

The other explanations are omitted because they are similar to those in case of FIG. 1.

As mentioned above, even in the video photographing apparatus in FIG. 3, even in the relatively dark state, a clear image can be recorded by the infrared rays reflected from the object.

According to the video photographing apparatus having the infrared rays AV transmitting function of claim 1, there is provided the video photographing apparatus having the infrared rays AV transmitting function, comprising: exchanging means of the infrared rays cutting filter and the infrared rays transmitting material, for moving the infrared rays cutting filter serving as a component element of the camera portion to the outside of an optical path and, in place of it, for arranging the infrared rays transmitting material such that the optical path is equivalent to that of the infrared rays cutting filter onto the optical path; the switching means for switching the infrared rays emitting unit for infrared rays AV transmission to the turn-on in the non-modulating state; and the sensitivity switching operating means for making the exchanging means and the switching means operative in the interlocking manner.

Therefore, in the dark state (at the time of the low illuminance), when the sensitivity switching operating means is switched to the high sensitivity side, the infrared rays are irradiated from the infrared rays emitting unit to the object and the sensitivity of the camera portion is improved, so that the photographing can be performed in the low illuminance as compared with the conventional one.

Moreover, since the number of parts which are added is also small, it is advantageous in terms of costs.

According to the video photographing apparatus having the infrared rays AV transmitting function of claim 2, in the video photographing apparatus according to claim 1, the optical axis correcting means for correcting so as to make the optical axial direction of the infrared rays emitting unit coincide with the optical axial direction where the infrared rays enter the camera portion is made operative in the interlocked relation with the sensitivity switching operating means.

In addition to the effects according to the video photographing apparatus of claim 1, therefore, the infrared rays can be effectively irradiated to the object and the object can be photographed by a smaller light emitting power.

According to the video photographing apparatus having the infrared rays AV transmitting function of claim 3, in the video photographing apparatus according to claim 1, the exchanging means of the infrared rays cutting filter and the infrared rays transmitting material has a structure such that both of them are slid on the same plane in the direction perpendicular to the optical path.

In addition to the effects according to the video photographing apparatus of claim 1, therefore, an effect such that the camera portion can be constructed in a miniature size can be obtained.

According to the video photographing apparatus having the infrared rays AV transmitting function of claim 4, in the video photographing apparatus according to claim 1, the exchanging means of the infrared rays cutting filter and the infrared rays transmitting material has the structure such that both of them are rotated on the same plane in the direction perpendicular to the optical path.

Therefore, an effect similar to that in the video photographing apparatus of claim 3 can be obtained.

According to the video photographing apparatus having the infrared rays AV transmitting function of claim 5, in the video photographing apparatus according to claim 1, the exchanging means of the infrared rays cutting filter and the infrared rays transmitting material has the structure such that one of them is arranged on the optical path by the rotation of the rotational axis arranged in the direction perpendicular to the optical path.

Therefore, an effect similar to that in the video photographing apparatus of claim 3 can be obtained.

According to the video photographing apparatus having the infrared rays AV transmitting function of claim 7, in the video photographing apparatus having the infrared rays AV transmitting function, there are provided: moving means for moving the infrared rays cutting filter as a component element of the camera portion to the outside of the optical path; switching means for switching the infrared rays emitting unit for the infrared rays AV transmission to the turn-on in the non-modulating state; and sensitivity switching operating means for making the exchanging means and the switching means operative in an interlocking manner.

Therefore, an effect similar to that in the video photographing apparatus of claim 1 can be obtained.

According to the video photographing apparatus having the infrared rays AV transmitting function of claim 8, in the video photographing apparatus of claim 7, the optical axis correcting means for correcting so as to make the optical axial direction of the infrared rays emitting unit coincide with the optical axial direction where the infrared rays enter the camera portion is constructed so as to be made operative in an interlocked relation with the sensitivity switching operating means.

Therefore, an effect similar to that in the video photographing apparatus of claim 2 can be obtained.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A video photographing apparatus having an infrared rays AV transmitting function, characterized by comprising:

exchanging means for moving an infrared rays cutting filter serving as a component element of a camera portion to an outside of an optical path and, in place of it, for arranging an infrared rays transmitting material such that an optical path is equivalent to that of said infrared rays cutting filter onto said optical path;

switching means for switching an infrared rays emitting unit for an infrared rays AV transmission to a turn-on in a non-modulating state; and sensitivity switching operating means for making said exchanging means and said switching means operative in an interlocking manner.

2. A video photographing apparatus according to claim 1, characterized in that: said apparatus has optical axis correcting means for correcting so as to make an optical axial direction of said infrared rays emitting unit coincide with the optical axial direction where the infrared rays enter said camera portion; and that said optical axis correcting means is constructed so as to be made operative in an interlocked relation with said sensitivity switching operating means.

3. A video photographing apparatus according to claim 1, characterized in that said exchanging means has a structure such that said infrared rays cutting filter and said infrared rays transmitting material are slid on a same plane in the direction perpendicular to the optical path.

4. A video photographing apparatus according to claim 1, characterized in that said exchanging means has a structure such that said infrared rays cutting filter and said infrared rays transmitting material are rotated on a same plane in the direction perpendicular to the optical path.

5. A video photographing apparatus according to claim 1, characterized in that said exchanging means has a structure such that one of said infrared rays cutting filter and said infrared rays transmitting material is arranged onto the optical path by a rotation of a rotational axis arranged in the direction perpendicular to the optical path.

6. A video photographing apparatus according to claim 1, characterized in that said infrared rays transmitting material is a transparent glass.

7. A video photographing apparatus having an infrared rays AV transmitting function characterized by comprising:

moving means for moving an infrared rays cutting filter as a component element of a camera portion to an outside out of an optical path;

switching means for switching an infrared rays emitting unit for said infrared rays AV transmission to a turn-on in a non-modulating state; and sensitivity switching operating means for making said moving means and said switching means operative in an interlocking manner.

8. A video photographing apparatus according to claim 7 characterized in that: said apparatus has optical axis correcting means for correcting so as to make an optical axial direction of said infrared rays emitting unit coincide with an optical axial direction where infrared rays enter said camera portion; and that said optical axis correcting means is constructed so as to be made operative in an interlocked relation with said moving means.

* * * * *